(12) United States Patent
Eslambolchi

(10) Patent No.: US 6,370,110 B1
(45) Date of Patent: Apr. 9, 2002

(54) BACK-UP RESTORATION TECHNIQUE FOR SONET/SHD RINGS

(75) Inventor: Hossein Eslambolchi, Basking Ridge, NJ (US)

(73) Assignee: AT&T Corp, New York, NY (US)

(*) Notice: Subject to any disclaimer, the term of this patent is extended or adjusted under 35 U.S.C. 154(b) by 0 days.

(21) Appl. No.: 09/154,326

(22) Filed: Sep. 16, 1998

(51) Int. Cl.⁷ .............................................. G01R 31/08
(52) U.S. Cl. ...................... 370/216; 370/242; 370/248
(58) Field of Search ................................ 370/216, 220, 370/222, 223, 224, 228, 248, 244, 245, 351, 352, 358, 367, 389, 395, 426, 463, 466, 487, 535, 217, 219, 221, 227, 241, 242, 406; 359/110, 119; 709/227, 239; 714/25, 43

(56) References Cited

U.S. PATENT DOCUMENTS

| | | | |
|---|---|---|---|
| 5,179,548 A | | 1/1993 | Sandesara |
| 5,182,744 A | * | 1/1993 | Askew et al. ............... 370/228 |
| 5,278,824 A | * | 1/1994 | Kremer ....................... 370/223 |
| 5,282,200 A | * | 1/1994 | Dempsey et al. ........... 370/245 |
| 5,442,623 A | * | 8/1995 | Wu .............................. 370/224 |
| 5,495,472 A | * | 2/1996 | Ohara ......................... 370/224 |
| 5,517,489 A | * | 5/1996 | Orgura ........................ 370/223 |
| 5,537,393 A | * | 7/1996 | Shioda et al. ............... 370/223 |
| 5,550,805 A | * | 8/1996 | Takatori et al. ............. 370/222 |
| 5,574,719 A | * | 11/1996 | Ishiwatari ................... 370/351 |
| 5,623,482 A | * | 4/1997 | Okanoue ..................... 370/224 |
| 5,748,617 A | * | 5/1998 | McLain, Jr. ................. 370/244 |
| 5,757,774 A | * | 5/1998 | Oka ............................ 370/242 |
| 5,781,535 A | | 7/1998 | Russ et al. .................. 370/248 |
| 5,793,745 A | * | 8/1998 | Manchester ................. 370/224 |
| 5,796,953 A | * | 8/1998 | Zey ............................. 709/227 |
| 5,799,001 A | * | 8/1998 | Lee et al. .................... 370/220 |
| 5,805,568 A | * | 9/1998 | Shinbashi ................... 370/223 |
| 6,122,249 A | * | 9/2000 | Mochizuki et al. ......... 370/220 |
| 6,256,292 B1 | * | 7/2001 | Ellis et al. .................. 370/227 |

FOREIGN PATENT DOCUMENTS

EP    0493174 A1    7/1992

OTHER PUBLICATIONS

Hafner E et al., "Enhancing The Availability Of A Loop System By Meshing," International Zurich Seminar On Digital Communications, US, Long Beach, IEEE, vol. Proc. 1976, p. D41–D45 XP002075168.

* cited by examiner

Primary Examiner—Seema S. Rao
Assistant Examiner—Phirin Sam
(74) Attorney, Agent, or Firm—Robert B. Levy

(57) ABSTRACT

A restoration network architecture (100) includes both service and protection SONET/SDH rings (15, 17) as well as a mesh network (25) including point-to-point paths ($26_1$–$26_2$). Monitoring Equipment (28, 30) monitor the status of service links ($14_1$–$16_4$) and protection links ($16_1$–$16_4$) in the service and protection rings, respectively, along with the status of the point-to point links in the mesh network. Upon detecting a failure of one of the service links and point-to-point links, an Operations Systems Data Server (32) establishes a restoration path based on the available protection links and available point-to-point links. Traffic is then restored on such the restoration path. In this way, a failure in the service ring can be restored in the mesh network while a failure in the mesh network can be restored in the protection ring.

7 Claims, 2 Drawing Sheets

BACK-UP RESTORATION TECHNIQUE FOR SONET/SHD RINGS

TECHNICAL FIELD

This invention relates to a technique for restoring traffic in a SONET/SDH ring network.

BACKGROUND ART

Most major providers of telecommunications services, such as AT&T, now rely primarily on optical fiber cables to carry long-haul and even some short haul traffic. As compared to copper cable and microwave transmission facilities previously used to carry telecommunication traffic, optical fiber cables offer higher traffic capacity and provide higher quality. The development of large networks of fiber optic cables has prompted the need for a fast and efficient mechanism for accomplishing restoration in case of a failure, due to a severed fiber optic cable or an inoperative piece of terminal equipment. In the early 1990's, telecommunication network service providers used mesh-based restoration architectures. U.S. Pat. No. 5,182,744, issued on Jun. 26,1993 in the name of James Askew et al. and assigned to AT&T, (incorporated by reference herein) describes and claims a mesh-based restoration architecture, known commercially as "FASTAR." The FASTAR system has been deployed with much success by AT&T and remains in use today.

In the mid-1990's, many telecommunications network service providers, including AT&T, began large-scale deployment of SONET/SDH fiber optic ring networks in response to an increase in data communications traffic. A typical SONET/SDH fiber optic ring network includes a 1X1 configuration with a protection ring associated with each service ring. A Lightwave Capacity Terminal monitors traffic on each service ring, and in case of a failure, the terminal switches traffic onto a protection ring, usually within 60-200 milliseconds. Such fast switching is critical for data communications since data is more susceptible to delays as long delays may cause synchronization failures.

In practice, SONET/SDH rings may not always offer the high reliability that they claim. For example, the protection rings may not always be available because of the nature of the Lightwave Capacity Terminals. For example, the protection ring may not be effective to carry traffic if the protection switching occurs simultaneously with a cable cut. Another factor that limits the reliability of SONET/SDH rings is the increasing size of such rings due to right-of-way restrictions. The increased size of such rings has increased the occurrence of double optical fiber cuts that affect both the service and protection rings.

Thus, there is a need for technique that affords increased reliability in an SONET/SDH ring.

BRIEF SUMMARY OF THE INVENTION

Briefly, the present invention provides a method for restoring traffic in a network that includes (i) at least one service ring configured of first links that each run between pairs of nodes to form a ring-like path, (ii) at least one protection ring configured of second links that run generally parallel with the a corresponding first link; and (iii) a mesh sub-network network that includes a plurality of third links that provide point-to-point connectivity between pairs of the nodes. The service and protection rings are monitored to determine whether each link is in an active state (capable of carrying traffic) or a failed state (incapable of carrying traffic). The mesh network is monitored simultaneously monitored along with the service and protection rings links to determine the whether each third link is an active state or a failed state. Upon finding a failed link in one of the service rings and mesh network, a restoration path is designated, utilizing at least one link from a group of active second and third links, for carrying the traffic previously carried by the failed link. After establishing the restoration path, the traffic within the network is switched from the failed link onto the restoration path.

DETAILED DESCRIPTION

Figure 1:
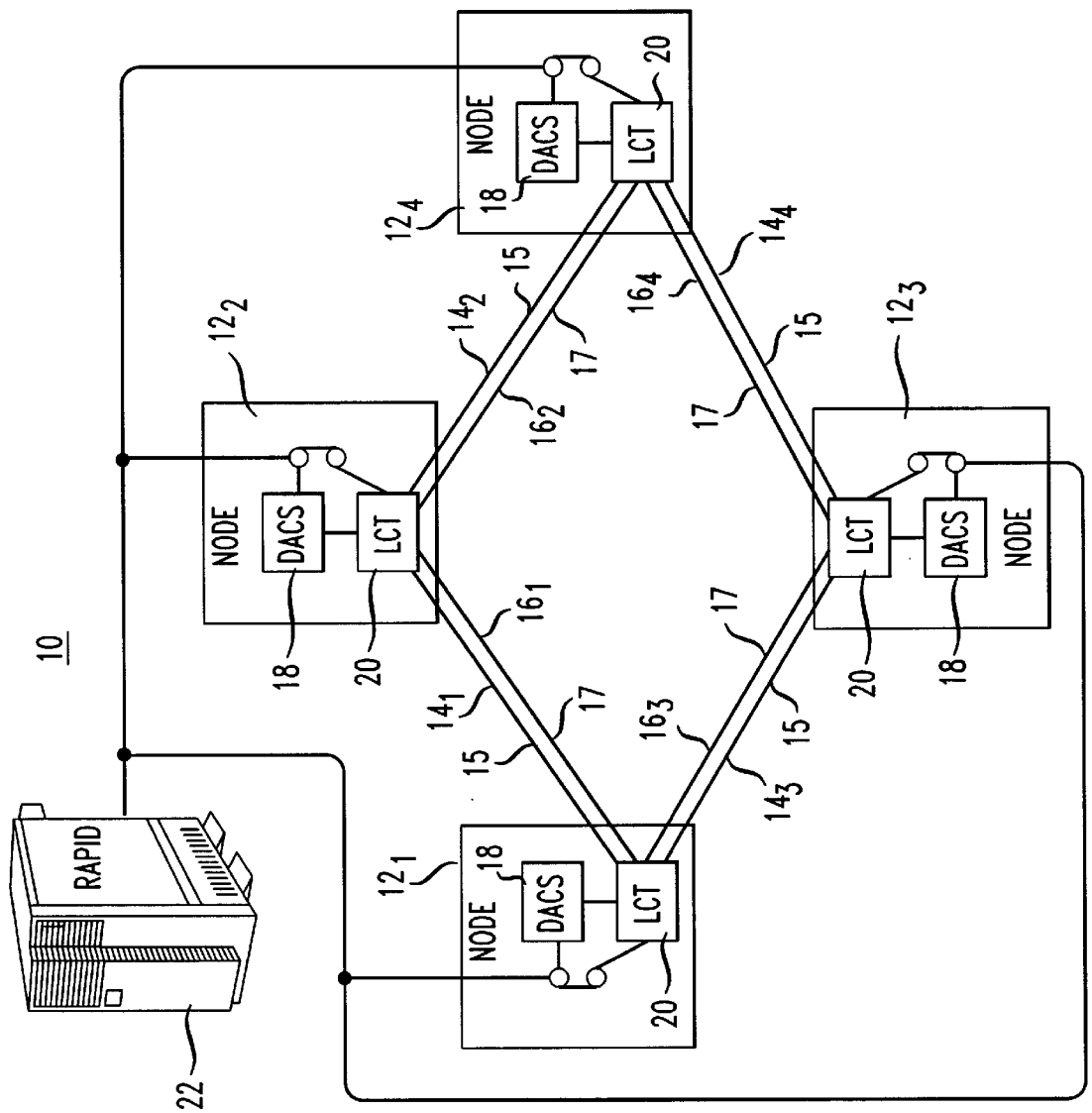
FIG. 1 illustrates a prior-art SONET/SDH network including a central processor for monitoring the status of service and protection rings.

FIG. 1 illustrates a prior art SONET/SDH ring network 10 comprised of a plurality of nodes $12_1, 12_2, 12_3 \ldots 12_n$. In the illustrated embodiment of FIG. 1, n=4. In other embodiments, the network 10 may include a larger or smaller number of nodes. Each of the nodes $12_1-12_4$ is coupled to a neighboring node by one of a set of first links $14_1-14_4$ to form a first or service ring 15 that carries normal traffic between nodes around the ring. Each of a set of second links $16_1-16_4$ couples an associated one of the nodes $12_1-12_4$ to its neighbor to form a second or protection ring 17 that carries restoration traffic between nodes around the protection ring in the event of a failure of one of the first links $14_1-14_4$. In practice, each of the links $14_1-14_4$-and $16_1-16_4$ comprises an optical fiber capable of carrying optically formatted traffic at an OC-48 rate, although higher or lower rates are possible. Although the network 10 is depicted as comprising a single service ring 15 and a single protection ring 17, the network could comprise a plurality of service and protection rings, typically, although not necessarily, in a one-to-one relationship.

Each node, such as node $12_1$, includes a Digital Cross-connect System (DCS) 18, such as manufactured by Lucent Technologies, Inc. or Alcatel. The DCS 18 cross-connect traffics from at least one source, such as a central office (not shown) to a Lightwave Communications Terminal (LCT) 20 at the node. The LCT 20 converts electrical signals received from its associated DCS 18 to an optical format for transmission via a corresponding one of the links $14_1-14_4$ to an adjacent node on the service ring. Conversely, the LCT 20 at each node converts optically formatted traffic received on a service ring link into electrical signals for receipt by the DCS 18 coupled to the LCT. Additionally, the LCT 20 at each of the nodes $12_1-12_4$ can format traffic onto, and off the links $16_1-16_4$ of the protection ring 17 as discussed below.

Each LCT 20 has the capability of monitoring the status of the particular ones of the links $14_1-14_4$ and $16_1-16_4$ to which it is connected. In particular, each LCT 20 determines whether the links to which it is connected are active (i.e., capable of carrying traffic) or have failed (incapable of carrying traffic). A central controller (RAPID) 22 receives the monitoring information from each LCT 20 and makes decisions concerning the switching of traffic based on the status of the links $14_1-14_4$ and $16_1-16_4$. For example, if link $14_1$ within the service ring 15 connecting the nodes $12_1$ and $12_2$ fails, then the LCT 20 at one or both of the nodes $12_1$ and $12_2$ will notify the controller 22 of that fact. In response, the central controller 22 notifies the LCT 20 at each of the nodes 12$_1$ and 12$_2$ to switch traffic onto the protection link 16$_1$ to restore service.

In some instances, the protection links 16$_1$–16$_4$ may not always be available. For example, the LCT 20 at each node is generally not able to effect switching simultaneously with a cable cut. Further, double cable cuts can and do occur, causing the simultaneous loss of two or more of the service links 14$_1$–14$_4$ and/or two or more of the protection links 16$_1$–16$_4$. Under such circumstances, traffic restoration within the network 10 becomes impossible without repair of one or more severed links.

Figure 2:
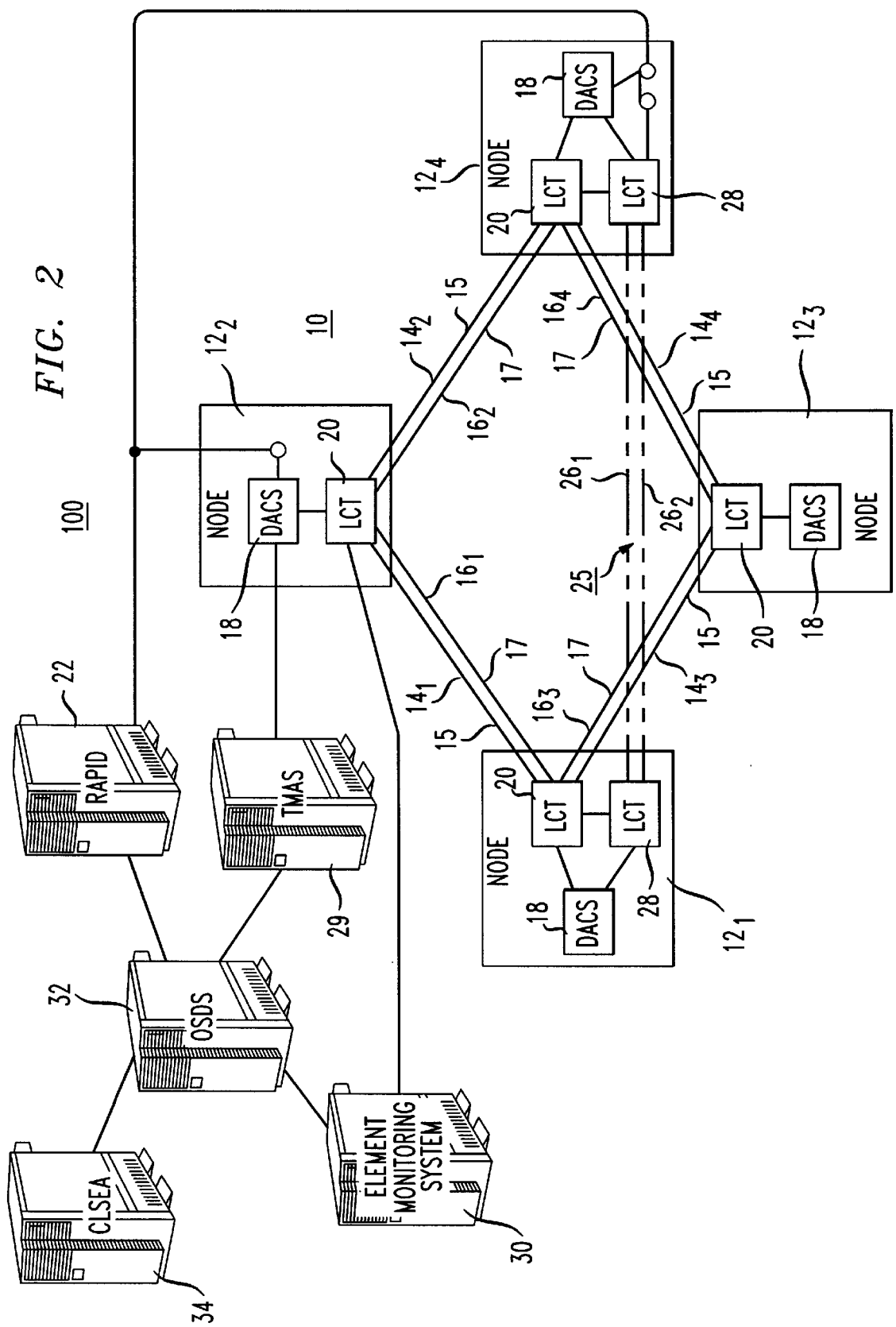
FIG. 2 illustrates a restoration network architecture in accordance with the present invention that includes a SONET/SDH sub-network and a mesh sub-network.

FIG. 2 illustrates a restoration network architecture 100 in accordance with the invention that includes a SONET/SDH sub-network 10 configured as described previously with FIG. 1 with like reference numbers describing like elements. Like the SONET/SDH network 10 of FIG. 1, the SONET/SDH sub-network 10 of FIG. 2 includes the service and protection rings 15 and 17, configured of links 14$_1$–14$_4$ and 16$_1$–16$_4$, respectively, that link the nodes 12$_1$–12$_4$.

In addition, the restoration network 100 also a mesh sub-network 25 comprised of one or more point-to-point links that interconnect selected nodes. In the embodiment of FIG. 2, the mesh sub-network 25 includes links 26$_1$ and 26$_2$ that each extend between the nodes 12$_1$ and 12$_4$ for termination at a LCT 28 at each respective node. Like the LCT 20, the LCT 28 at each node is connected to the DCS 20 at that node. While the mesh sub-network 25 of FIG. 2 includes a single pair of point-to-point nodes 26$_1$ and 26$_2$, the mesh sub-network could include a larger or smaller number of point-to-point links. the network 10 of FIG. 1, the network 100 of FIG. 2 also includes a central controller (RAPID) 22 for effecting switching of traffic from one of the service links 14$_{1-4}$ onto the corresponding one of the protection links 16$_1$–16$_4$ if available. Additionally, in accordance with the invention, the central controller 22 has access to the point-to-point links in the mesh sub-network 25, such as links 26$_1$ and 26$_2$. In this way, the controller 22 can initiate a switch of traffic from a failed one of the service links 14$_1$–14$_4$ onto a restoration path comprised of one or more of the point-to-point links in the mesh sub network 25. Alternatively, with access to the mesh network 25, the controller 22 can also switch traffic from a failed one of the point-to-point links, such as links 26$_1$ and 26$_2$ for example, onto a restoration path comprised of one or more of the protection links 16$_1$–16$_4$.

To facilitate the switching of traffic between the SONET/SDH sub-network 10 and the mesh sub-network 25 to effect restoration, the network 100 of FIG. 1 includes a Transport Maintenance Administration System (TMAS) 28 coupled to the DCS 18 at each node for monitoring the status of the traffic, and hence the link status. An element monitoring system 30 monitors the status of the elements, such as each LCT 20, associated with the service and protection rings 15 and 17, respectively. Both the element monitoring system 30 and the TMAS system 28 communicate with an Operations System Data Server (OSDS) 32 that receives information from a Common Language Specific Equipment Assignment (CLSEA) system 34 that tracks the assignment of elements within the network, and particularly, the assignment of the links to corresponding nodes.

Based on the element assignments received from the CLSEA system 34, and the status of the traffic and SONET equipment received from the TMAS 28 and the monitoring system 30, respectively, the OSDS 32 automatically establishes (provisions) one or more restoration paths to restore service. For example, assume that both of the point-to-point links 26$_1$ and 26$_2$ have become inoperative, due to an equipment failure or a cable cut. The TMAS 28 detects the failure of the point-to-point links and communicates that information to the OSDS 32. In turn, the OSDS 32 queries the CLSEA 34 to determine the network element assignments.

In the preferred embodiment, the CLSEA 34 will identify the existence of the protection link 16$_3$ extending between the nodes 12$_1$ and 12$_3$, and the existence of the protection link 16$_4$ extending between the nodes 12$_3$ and 12$_4$. From that knowledge, the OSDS 32 designates a restoration path between the nodes 12$_1$ and 12$_4$ comprised of the protection paths 16$_3$ and 16$_4$. Thereafter, the OSDS 32 advises the central controller 22, which in response, signals the affected nodes 12$_1$, 12$_3$ and 12$_4$ to effect switching of the traffic previously carried by the failed one of the point-to-point links 26$_1$ and 26$_2$ onto the restoration path comprised of the protection links 16$_3$ and 16$_4$.

The network 100 may also effect restoration of traffic previously carried by a failed one of the service links 14$_1$–14$_4$ by switching such traffic onto one or more of the point-to-point links in the mesh network 25. For example, assume at least one of the service links 14$_3$ and 14$_4$ has failed and that the corresponding one of protection links 16$_3$ and 16$_4$ is likewise unavailable. Under such circumstances, TMAS system 28 alerts the OSDS 32 of the service ring link and protection ring link unavailability. In response, the OSDS 32 queries the CLSEA system 34 to determine various element assignments, and specifically, the assignment of the point-to-point links, such as the links 26$_1$ and 26$_2$, in the mesh network 25. From the information obtained from the CLSEA 34, the OSDS 32 designates a restoration path comprised of one of the point-to-point links 26$_1$ and 26$_2$ in the mesh network 25 to carry traffic between the nodes 12$_1$ and 12$_4$ that would otherwise pass between the nodes 12$_1$ and 12$_4$ but for the failure of one or both of the links 14$_3$ and 14$_4$.

In comparison to the prior art SONET/SDH network 10 of FIG. 1, the network 100 of FIG. 2 advantageously affords the controller 22 the ability to effect restoration of traffic from the SONET network 10 onto the mesh network 25 and vice versa. The TMAS 28 and the element monitoring system 30 provide the OSDS 32 with the status of links and elements, thus allowing the OSDS to advise to establish a restoration path based on the availability of links, and the link assignments from the CLSEA 34. Having thus established the restoration path, the OSDS 32 informs the central controller 22 accordingly. The ability of the network 100 of the invention to provide the central controller 22 with information regarding the availability of restoration paths via the protection ring 17 and the mesh network 25 will allow for restoration of as much as 95% of network traffic, resulting in much less lost traffic than was heretofore achievable, thus improving customer satisfaction.

The above-described embodiments merely illustrate the principles of the invention. Those skilled in the art may make various modifications and changes that will embody the principles of the invention and fall within the spirit and scope thereof.

What is claimed is:

1. For use with a network that includes (i) at least one service ring configured of first links that each run between a pair of nodes to form a ring-like path; (ii) at least one protection ring configured of second links that each runs between said pair of nodes in parallel with a corresponding first link; and (iii) a mesh sub-network network that includes a plurality of third links that collectively provide point-to-point connectivity between selected nodes, a method for restoring traffic in the event of a failure of a failed link, comprising:

monitoring the service and protection rings, respectively, to determine whether each of the first and second links is one of a failed or active state;

simultaneously monitoring the mesh network to determine whether each third link is in an active or failed state; and establishing, in response to a determination that one of said first and third links has failed, a restoration path comprised of at least one of said second and third links that are in an active state, and effecting the switching of traffic from a failed one of said first links and third links, as determined from said monitoring steps, onto said restoration path.

2. The method according to claim 1 wherein a restoration path is established from one or more active third links in response to a failure of a first link.

3. The method according to claim 1 wherein a restoration path is established from one or more active second links in response to a failure of a third link.

4. A restoration network comprising:

at least one service ring configured of first links that each runs between a pair of nodes to form a ring-like path, at least one protection ring configured of second links that each runs between said pair of nodes in parallel with a corresponding first link;

a mesh sub-network network that includes a plurality of third links that collectively provide point-to-point connectivity between selected nodes:

means for monitoring the service and protection rings to determine whether each of the first and second link is one of a failed or active state; and for monitoring the mesh network simultaneously with the service and protection rings to determine whether each third link is in an active or failed state; and means for establishing, in response to a determination that one of said first and third links has failed, a restoration path comprised of at least one of said second and third links that is in an active state, and means for switching traffic from a failed one of said first links and third links, as determined from said monitoring steps, onto said restoration path.

5. The network according to claim 4 wherein said restoration path establishing means comprises:

a common language specific equipment Assignment (CLSEA) system that maintains information concerning link assignments; and an operations systems data server (OSDS) for establishing the restoration path in accordance with information from said CLSEA system and said monitoring means.

6. The apparatus according to claim 4 wherein each of said first, second, and third links each comprise an optical fiber link.

7. The apparatus according to claim 4 wherein the monitoring means comprises:

a transport maintenance administration system (TMAS) for monitoring traffic in said network; and an element monitoring system for monitoring elements in said service and protection rings.

* * * * *

UNITED STATES PATENT AND TRADEMARK OFFICE
CERTIFICATE OF CORRECTION

PATENT NO.     : 6,370,110 B1
DATED          : April 9, 2002
INVENTOR(S)    : Hossein Eslambolchi It is certified that error appears in the above-identified patent and that said Letters Patent is hereby corrected as shown below:

Title page,
Item [54], the title reads: "BACK-UP RESTORATION TECHNIQUE FOR SONET/SHD RINGS" should read -- BACK-UP RESTORATION TECHNIQUE FOR SONET/SDH RINGS --.

Signed and Sealed this

Ninth Day of July, 2002

Attest:

Attesting Officer

JAMES E. ROGAN
Director of the United States Patent and Trademark Office